Dec. 26, 1950 G. E. HENNING 2,535,286
APPARATUS FOR WORKING AND ADVANCING PLASTIC MATERIAL
Filed Nov. 13, 1946 2 Sheets-Sheet 1

INVENTOR
G. E. HENNING
BY [signature]
ATTORNEY

Dec. 26, 1950 G. E. HENNING 2,535,286
APPARATUS FOR WORKING AND ADVANCING PLASTIC MATERIAL
Filed Nov. 13, 1946 2 Sheets-Sheet 2

INVENTOR
G.E. HENNING
BY *[signature]*
ATTORNEY

Patented Dec. 26, 1950

2,535,286

UNITED STATES PATENT OFFICE 2,535,286

APPARATUS FOR WORKING AND ADVANCING PLASTIC MATERIAL

George E. Henning, Baltimore, Md., assignor to Western Electric Company, Incorporated, New York, N. Y., a corporation of New York Application November 13, 1946, Serial 709,480

6 Claims. (Cl. 18—13)

This invention relates to apparatus for working and advancing plastic material, and more particularly to extrusion screws for forcing plastic material through extrusion cylinders and for simultaneously plasticizing the material.

In the manufacture of extruded products, such as insulated conductors, plastic material, such as thermoplastic compounds or compounds including rubber or synthetic rubber-like materials, sometimes are milled to thoroughly mix and plasticize the material so that it may be extruded properly. The material then is inserted into an extruder, which extrudes the material upon a conductor, while the material is in a plastic condition. Such working operations are relatively expensive and require considerable handling of the material. In the past, there has been no apparatus for reducing or substantially eliminating the necessity of the working operations prior to the insertion of the material into the extruder.

An object of the invention is to provide new and improved apparatus for working and advancing plastic material.

A further object of the invention is to provide new and improved extrusion screws for forcing plastic material through extrusion apparatus and for simultaneously plasticizing the material.

An apparatus illustrative of the invention includes an extrusion screw for forcing plastic material through an extrusion apparatus and an extension of the extrusion screw having a plurality of tapered convex blades for working the plastic material.

A complete understanding of the invention may be obtained from the following detailed description of an apparatus forming a specific embodiment thereof, when read in conjunction with the appended drawings, in which.

Figure 1:
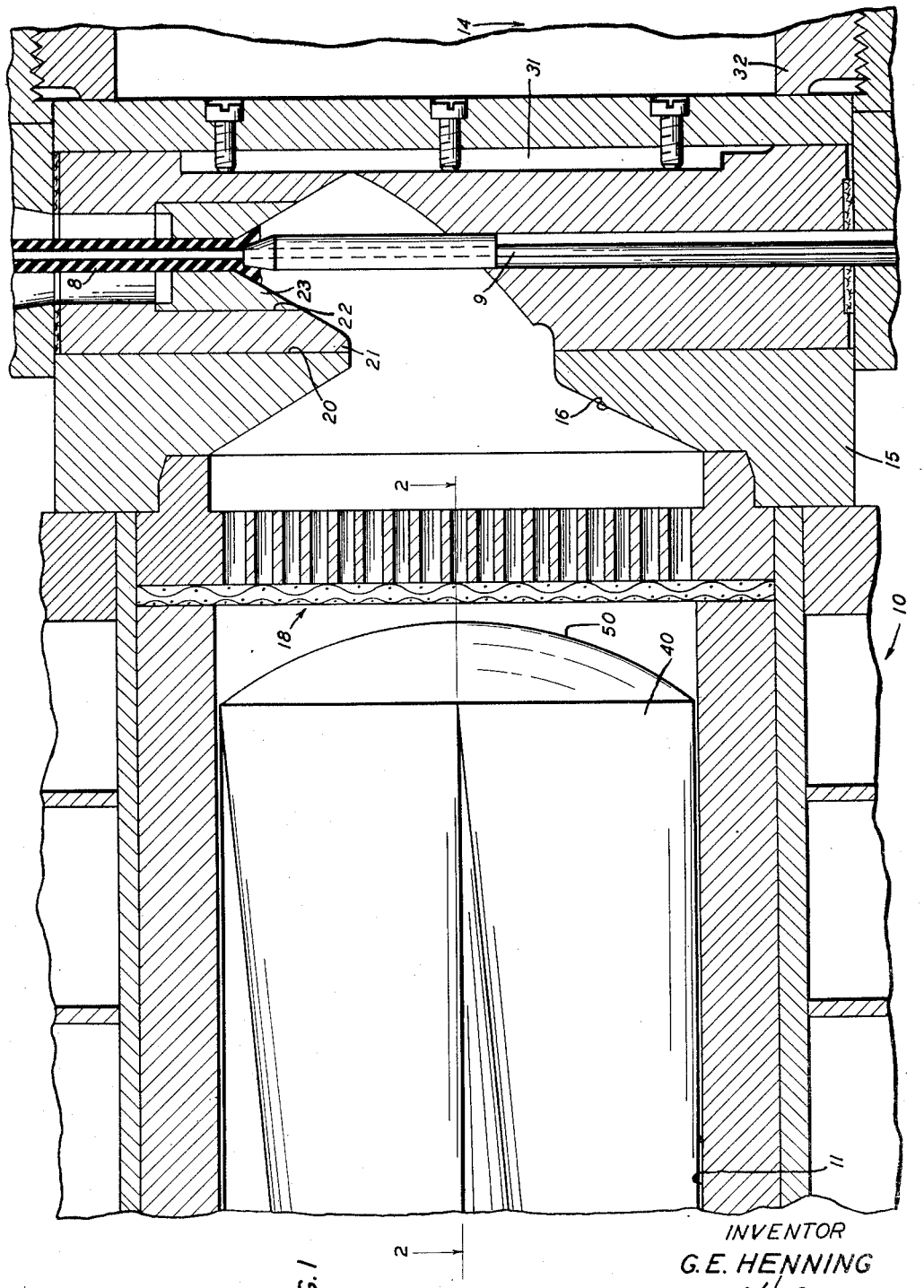
Fig. 1 is a fragmentary, horizontal section of an apparatus forming one embodiment of the invention.
Figure 2:
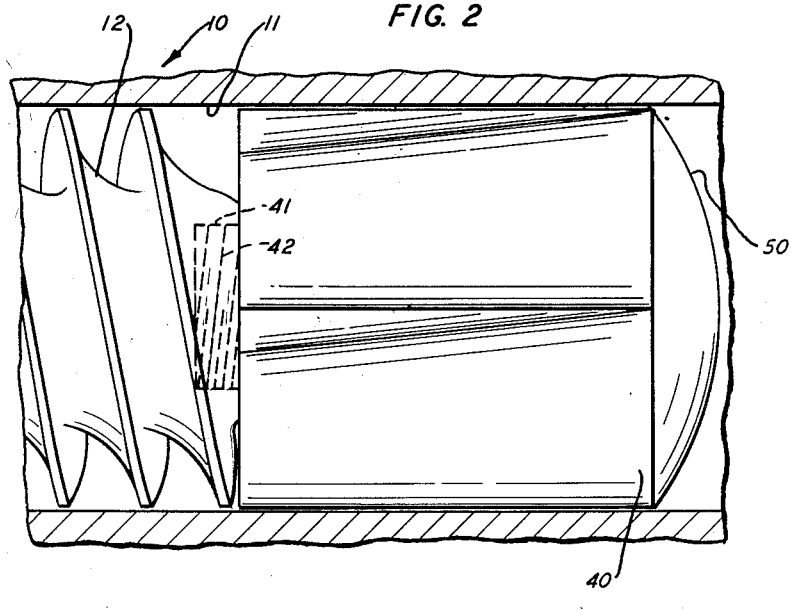
Fig. 2 is a reduced, fragmentary, vertical section taken along line 2—2 of Fig. 1.

Referring now in detail to the drawings, there is shown in Fig. 1 a continuous extrusion apparatus for forming a covering 8 from plastic material, such as a vulcanizable compound including rubber or a synthetic rubber-like material, or a thermoplastic material, around a filamentary conductor 9, which may be bare or may be covered with a textile or plastic covering. The extrusion apparatus includes a heated extrusion cylinder 10 having a cylindrical bore 11 formed therein in which a stock screw 12 (Fig. 2) is rotatably mounted. The stock screw is rotated by suitable means (not shown) to force the plastic material under a high pressure to an extruding head 14 (Fig. 1).

The extruding head includes a body member 15 having a tapered opening 16, and a strainer 18 is positioned between the end of the bore 11 and the tapered opening 16. The body member 15 is provided with an extrusion passage 20, which is connected by the tapered opening 16 to the bore 11. An annular die holder 21 positioned in the exit end of the extrusion passage 20 has a counterbore 22 formed therein in which is mounted a forming die 23.

The conductor 9 is advanced upwardly, as viewed in Fig. 1, by suitable conductor-advancing means, such as a capstan (not shown) through a core tube holder 25 and a core tube 26 extending from the exit of the core tube holder 25. The core tube holder is provided with an inclined concave surface 27 for deflecting the plastic material toward the die 23. An aligning plate 31 maintains the die holder 21 and the core tube holder 25, and thereby the die 23 and the core tube 26, centered relative to each other in the extrusion passage 20, and a retaining nut 32 holds these elements in the extruding head 14.

Figure 3:
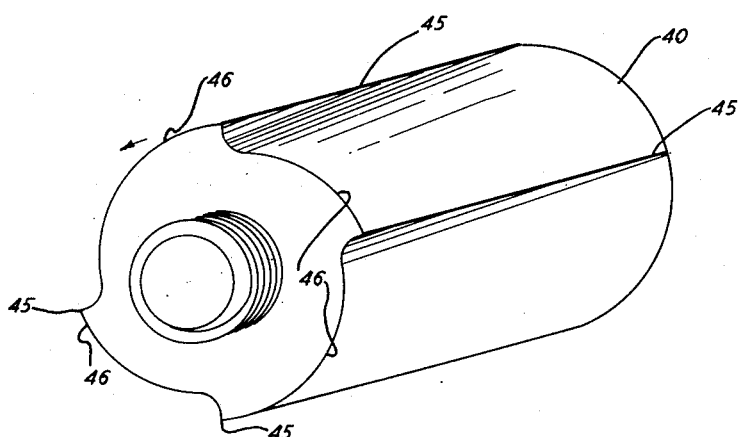
Fig. 3 is a perspective view of a portion of the apparatus.

A stock screw extension 40 (Figs. 2 and 3) is provided with a threaded boss 41, which fits into a tapped bore 42 in the end of the stock screw 12 to lock the extension rigidly to the stock screw in alignment with the stock screw. The periphery of the extension is provided with a plurality of blades 45—45 extending parallel with the longitudinal axis of the extension. The blades are provided with convex faces 46—46, which are the forward faces of the blades as the extension is turned by the stock screw 12 in the direction of the arrow in Fig. 3. Concave faces 47—47 of the blades taper away completely from the left end of the extension to the right end thereof, and the blades do likewise. That is, the blades and passages therebetween, which are fairly deep at the left ends thereof, dwindle to nothing at the right ends thereof. There is a slight clearance between the wall of the bore 11 (Fig. 2) and the right end of the extension to permit the plastic material to flow therethrough. The extension 40 is provided with a convex end 50 to permit the material to spread over the face of the strainer 18.

The fact that there is only slight clearance between the wall of the bore 11 and the right ends of the extension insures that all of the material is thoroughly worked as it is forced past the right end of the extension. Furthermore, the material is under a high pressure in the restricted passage at the right end of the extension, and is under a much lower pressure just to the right of the extension. That is, the material is forced through a high pressure, restricted area into a low pressure, relatively unrestricted area. This also tends to mix and work the material.

In the operation of the apparatus, the stock screw 12 and the stock screw extension 40 are rotated in the bore 11. The stock screw forces the material through the apparatus in the directions of the arrows in Fig. 1, and the convex faces 46—46 of the blades 45—45 roll the material up thereon to knead and shear the material against the wall of the bore 11. The kneading and shearing action progressively increases in intensity from the left end, as viewed in Fig. 2, of the extension to the right end thereof, and thoroughly plasticizes the material. The material is forced from the extension to and through the strainer 18, and the convex end 50 of the extension permits the material to flow radially in the exit of the bore 11 and to flow through the strainer over the entire face thereof. This renders the central portion of the face of the strainer effective as well as the outer portions thereof. The material then is forced through the extruding head 14, which forms it into the covering 8 over the conductor 9.

The extension 40 serves to thoroughly knead and mill the plastic material so that the material need be worked and heated only a little, if at all, prior to its introduction into the extrusion cylinder 10. The extension also spreads the material over the entire face of the strainer, thereby increasing the effective area of the strainer. Any standard stock screw may be easily adapted for assembly with the extension.

What is claimed is:

1. An apparatus for advancing and working insulating and jacketing plastic material, which comprises an imperforate conduit having a uniform diameter, and a member rotatably mounted in the conduit, said member being provided with means for forcing plastic material through the conduit and also being provided with an extension having a plurality of sharp-edged, convex blades extending substantially parallel to the longitudinal axis of the extension for kneading and milling the plastic material, the cross-sectional area of the space between the extension and the conduit decreasing from the start thereof toward the delivery end thereof.

2. An apparatus for advancing and working insulating and jacketing plastic material, which comprises an imperforate conduit having a uniform diameter, and a member rotatably mounted in the conduit, said member being provided with means for forcing plastic material through the conduit and also being provided with an extension having at least one sharp-edged blade extending substantially longitudinally with respect thereto, said blade having a convex leading face for kneading and milling the plastic material against the wall of the conduit, the space between the extension and the conduit converging from the start of the extension toward the delivery end thereof.

3. An apparatus for advancing and working insulating and jacketing compound, which comprises an extrusion cylinder having a bore therein, a stock screw mounted rotatably in the bore in the extrusion cylinder for forcing insulating and jacketing plastic material through the bore toward the delivery end thereof, and an extension attached to the delivery end of the stock screw, said extension being provided with at least one blade extending therealong, said blade having a convex leading face for coacting with the wall of the bore in the cylinder to work plastic material being forced through the cylinder by the stock screw and having a sharp edge so that turbulence in the flow of the material is created.

4. An apparatus for advancing and working insulating material, which comprises an extrusion cylinder having a uniform bore therein, a stock screw mounted rotatably in the bore in the extrusion cylinder for forcing insulating and jacketing plastic material toward the delivery end of the bore, and an extension attached to the delivery end of the stock screw, said extension being provided with at least one blade extending therealong, said blade having a convex leading face for coacting with the wall of the cylinder to work plastic material being forced through the cylinder by the stock screw and a sharply relieved trailing face to create turbulent flow of the material, said blade being tapered from a predetermined depth at the stock screw end thereof to a substantially shallower depth at the delivery end thereof, the space between the extension and the wall of the bore converging from the start of the extension toward the delivery end thereof so that the flow of the material is constricted near the delivery end of the member.

5. An extrusion apparatus, which comprises an extrusion cylinder having a uniform bore therein, a stock screw mounted rotatably in the bore for forcing insulating and jacketing plastic material through the bore toward the delivery end thereof, and an extension rigidly secured to one end of the stock screw and rotatable therewith, said extension being provided with at least one blade extending therealong, said blade being wedge-shaped in cross-section for coacting with the wall of the bore in the extrusion cylinder to knead and mill plastic material and having a sharp edge, the edge of said blade extending substantially parallel to the longitudinal axis of the element, the depth of said blade tapering to substantially zero at the end thereof farthest from the stock screw so that the passage formed by the extension and the wall of the bore converges toward the latter end.

6. An apparatus for extruding insulating and jacketing plastic compounds, which comprises a conduit having an imperforate portion and an entrance portion, and a member rotatably mounted in the conduit and provided with means extending along the entrance portion and a part of the imperforate portion of the conduit for advancing such a plastic compound, said member also being provided with an extension extending along a part of the imperforate portion of the conduit and having a plurality of sharp-edged, convex blades extending primarily longitudinally of the extension for kneading and milling the plastic compound, the inner periphery of the portion of the conduit coextensive with the extension being circular in cross-section along substantially the entire length thereof, said extension and the portion of the conduit coextensive therewith being so constructed and arranged that the clearance therebetween diminishes from the start thereof toward the delivery end of the extension.

GEORGE E. HENNING.

REFERENCES CITED

The following references are of record in the file of this patent:

UNITED STATES PATENTS

| Number | Name | Date |
|---|---|---|
| 309,567 | Schlickleysen | Dec. 23, 1884 |
| 388,940 | Williams, Jr. | Sept. 4, 1888 |
| 2,286,405 | Gordon | June 16, 1942 |
| 2,291,212 | Clinefelter | July 28, 1942 |
| 2,370,952 | Gordon | Mar. 6, 1945 |